May 26, 1942. H. E. EDWARDS 2,284,047
TRANSMISSION
Filed Aug. 17, 1940 3 Sheets-Sheet 1

WITNESSES:

INVENTOR
HILBERT E. EDWARDS.
BY
ATTORNEY

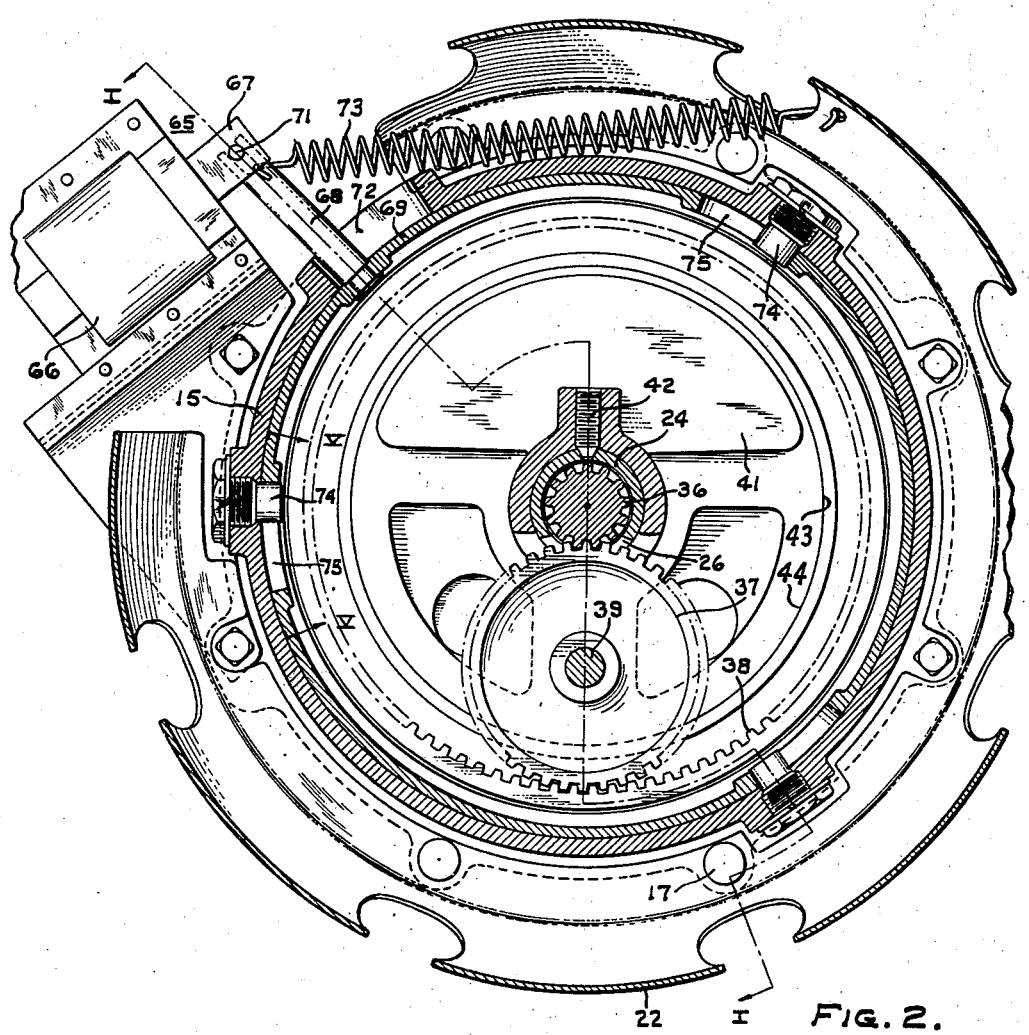
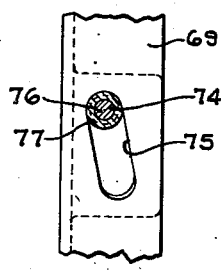
FIG. 5.
FIG. 2.
INVENTOR
HILBERT E. EDWARDS.
BY
ATTORNEY

May 26, 1942.  H. E. EDWARDS  2,284,047
TRANSMISSION
Filed Aug. 17, 1940   3 Sheets-Sheet 3

WITNESSES:
R. A. Ridge
E. H. Lutz

INVENTOR
HILBERT E. EDWARDS.
BY
ATTORNEY

Patented May 26, 1942

2,284,047

UNITED STATES PATENT OFFICE 2,284,047

TRANSMISSION

Hilbert E. Edwards, Mansfield, Ohio, assignor to Westinghouse Electric & Manufacturing Company, East Pittsburgh, Pa., a corporation of Pennsylvania Application August 17, 1940, Serial No. 353,049

10 Claims. (Cl. 74—291)

My invention relates to transmissions or speed changing mechanisms of the planetary gear type and has for an object to provide improved apparatus of this kind.

A further object of my invention is to provide an improved transmission for a machine for washing and centrifuging fabrics, which transmission will be reliable in operation and inexpensive to construct.

A still further object of the invention is to provide a novel multiple speed transmission having improved clutching and braking provisions included therein.

These and other objects are effected by my invention as will be apparent from the following description and claims taken in connection with the accompanying drawings, forming a part of this application, in which:

Fig. 2 is a transverse sectional view taken along the line II—II of Fig. 1;

Figs. 4 and 5 are sectional views of details taken, respectively, along the lines IV—IV and V—V of Figs. 1 and 2.

Figure 1:
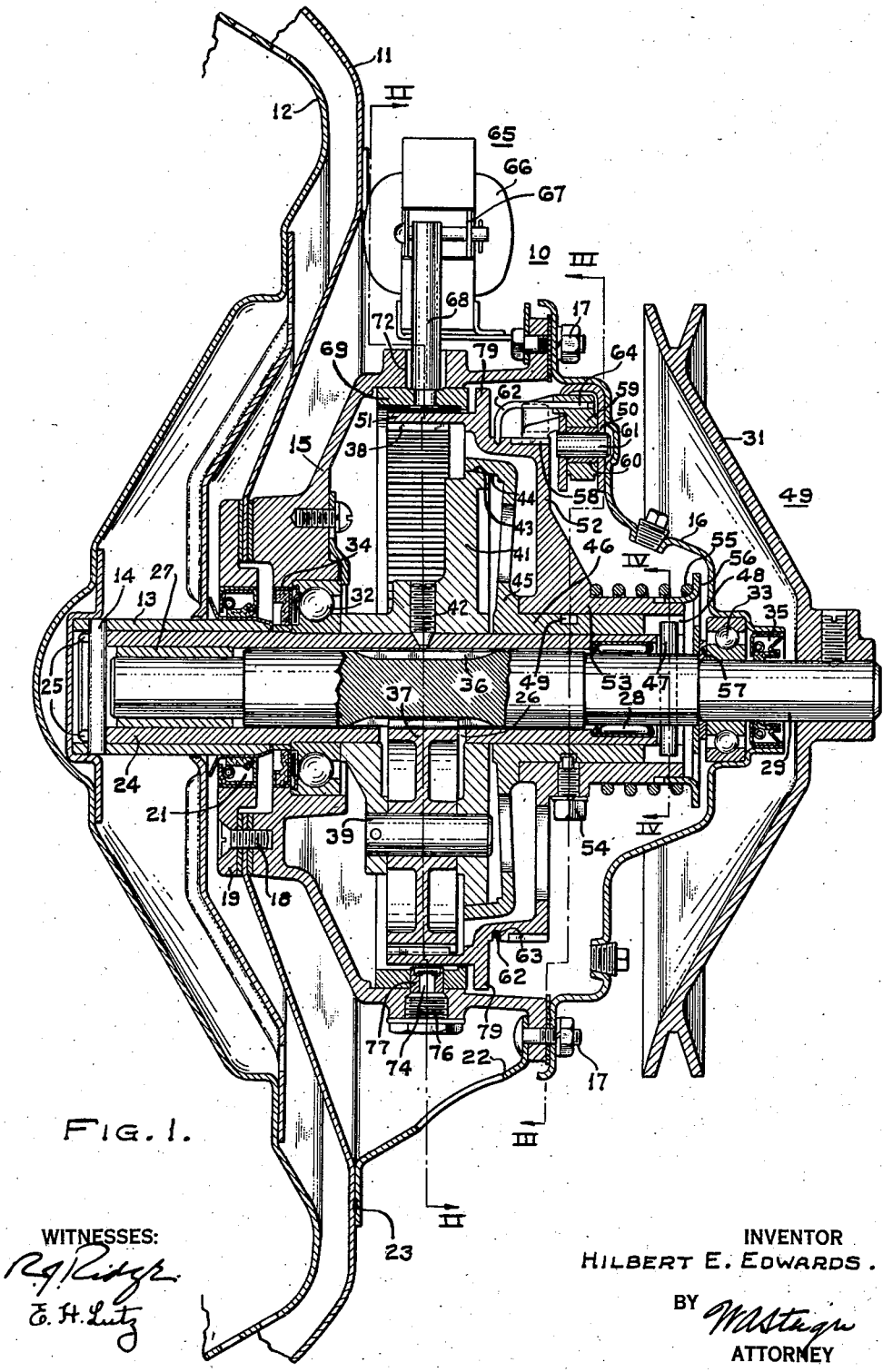
Fig. 1 is a vertical sectional view, taken substantially along the line I—I of Fig. 2, of a transmission constructed in accordance with the invention for application to a washing and spinning machine; portions of which are shown at the left of the view.

Reference will now be had to the drawings wherein I have shown my improved transmission, generally indicated by the numeral 10, applied to a laundry machine for washing fabrics and for spinning fluid therefrom. A portion of the tub of the laundry machine is indicated by the numeral 11 and a portion of the rotatable basket thereof is shown at 12. The basket 12 includes a hub portion 13 which is provided with a diametrically-extending pin 14 for a purpose to be referred to hereinafter.

The transmission 10 includes complementary casing sections 15 and 16 which are secured together in any well-understood manner, such as, for example, by means of bolts 17. The transmission 10 is supported from the tub structure 11 by means of screws, one of which is shown at 18. The screws 18 pass through suitable openings in the end of the tub 11 and are threaded into the end of the casing section 15 of the transmission. A clamping ring 19 is employed between the screws 18 and the inner surface of the tub 11, which clamping ring supports a water seal 21 of any well-understood construction. The water seal 21 engages the hub 13 of the basket 12 and defines therewith, a substantially water-tight connection. A further support for the transmission 10 is afforded by a frusto-conical ring member 22 which is welded, as shown at 23, to the tub 11 and which is secured at its outer end to an intermediate portion of the transmission 10, preferably by means of the bolts 17.

The basket 12 is carried and rotated by a sleeve 24 which extends inwardly of the transmission 10 and which supports the hub 13 of the basket at its outer end. Rotation of the hub 13 relative the sleeve 24 is prevented by the pin 14 which is disposed within diametrically-opposed slots 25 formed in the end of the sleeve 24.

In accordance with my invention, the sleeve 24 is provided with a radially-extending opening 26 in an intermediate portion thereof and is also provided with internal bearings 27 and 28 adjacent its ends. A driving shaft 29 for the transmission is journaled in the bearings 27 and 28 carried within the sleeve 24. The load on the bearing 28 is relatively heavy so that it is preferably of the anti-friction type, such as, for example, a roller bearing. The driving shaft 29 is rotated by a pulley 31 which is belted to a motor (not shown). In the embodiment disclosed, it will be assumed that the pulley 31 is rotated at a substantially constant speed of approximately 490 R. P. M.

The driving shaft 29 and the driven sleeve 24 define relatively rotatable, coaxially-aligned members which are supported in the transmission structure by means of anti-friction bearings 32 and 33, the former of which is disposed between the sleeve 24 and the casing member 15 and the latter of which is arranged between the driving shaft 29 and the casing member 16. The bearings 32 and 33 maintain the common axis of the shaft 29 and sleeve 24 in a fixed position relative the casing members 15 and 16 at all times. Lubricant seals 34 and 35 of any well-understood construction are arranged adjacent the bearings 32 and 33 for preventing the escape of lubricant from the transmission casing.

A sun gear 36, defined by teeth cut in an intermediate portion of the shaft 29, is arranged opposite the radially-extending opening 26 formed in the sleeve 24 and meshes with a planet gear 37 which, in turn, meshes with the teeth of an orbit gear structure 38. The planet gear 37 is rotatably supported by a stub shaft 39 which is fixed to a clutch member 41, the latter being secured to the sleeve 24 by a set screw 42.

The clutch member 41 is provided with an external clutching face 43 which cooperates with an internal clutching face 44 formed on a second clutch member 45, the latter being provided with a hub portion 46 which is journaled exteriorly of the sleeve 24. Rotation of the second clutch member 45 with the driving shaft 29 is effected at all times by a pin 47, fixed within the driving shaft 29 and extending within diametrically-opposed slots 48 provided at the end of the hub 46. A circumferentially-extending groove 49 is formed on the exterior of the hub 46 for a purpose to be referred to hereinafter.

The orbit gear structure 38 will now be described. The structure has its teeth formed within a longitudinally-extending cylindrical portion 51 and includes also web and hub portions 52 and 53, respectively. The hub portion 53 encompasses the hub portion 46 of the second clutching member and has a running fit thereon so that the second clutching member 45 and the orbit gear structure 38 are relatively rotatable. Movement of the orbit gear structure 38 relative the second clutching member 45 in an axial direction is, however, prevented by a pin 54 which is secured within the orbit gear structure 38 and which extends into the circumferentially-extending slot 49 associated with the second clutching member 45. The orbit gear structure 38 and the second clutching member 45 are biased toward the clutch-closed position by a helical spring 55 interposed between the orbit gear structure 38 and a disc 56, the latter bearing against a washer 57 carried by the driving shaft 29.

Figure 3:
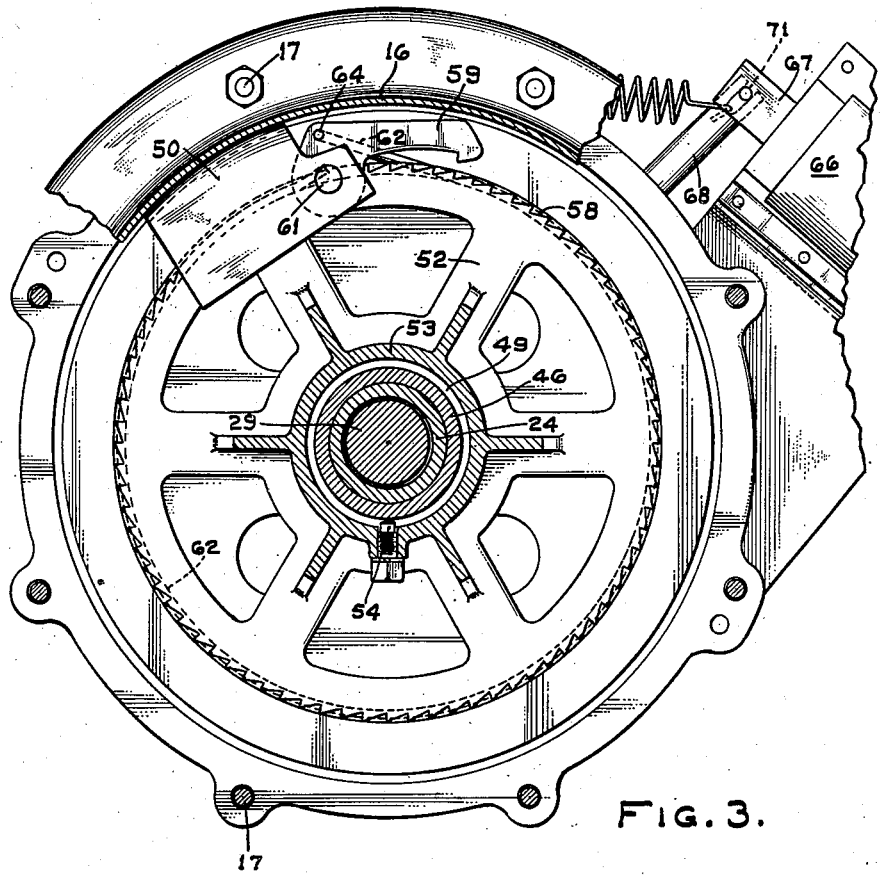
Fig. 3 is a transverse sectional view taken along the line III—III of Fig. 1.
Figure 4:
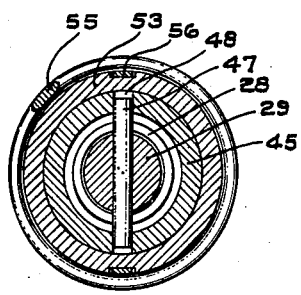

Arranged on the exterior of the cylindrical portion 51 of the orbit gear structure 38 is a series of ratchet teeth 58 which cooperate with a pawl 59, the latter being secured by means of a resilient bushing 60 to a pivot pin 61 which is rotatably carried by a support 50, U-shaped in cross section. The support 50 is secured, as by welding, to the casing member 16. It will be apparent from Fig. 3 that rotation of the orbit gear structure 38 in clockwise direction is prevented by the pawl and ratchet mechanism just described and that rotation thereof in counter-clockwise direction is permitted. During counter-clockwise rotation of the orbit gear structure, the pawl is lifted out of engagement with the ratchet teeth 58 in order to provide for quiet operation at this time. This operation is effected by a drag ring 62 which frictionally engages a circumferentially-extending groove 63 formed in the cylindrical portion 51 of the orbit gear structure, and which includes a portion 64 which extends axially into an opening formed in the pawl 59 in spaced relation with respect to the pivot 61. It will be apparent from the foregoing description that as the orbit gear structure 38 rotates in counterclockwise direction the drag ring 62, because of its frictional engagement with the orbit gear structure, will swing the pawl 59 in counterclockwise direction and out of engagement with the ratchet teeth 58. Immediately upon movement of the orbit gear structure in clockwise direction as viewed in Fig. 3 the drag ring 62 will swing the pawl 59 downwardly in clockwise direction until it engages the ratchet teeth 58. Accordingly, further clockwise rotation of the orbit gear structure is prevented.

The apparatus for effecting operation of the clutch will now be described. This apparatus includes an electro-magnet 65 having a winding 66 and an armature 67, the latter being connected by an arm 68 to a shifting ring 69 that is angularly movable within the casing member 15. As best shown in Fig. 2 the arm 68 is connected by a pin and slot connection 71 to the armature 67 and is riveted or otherwise secured to the shifting ring 69. The arm 68 extends through a suitable opening 72 formed in the casing member 15. A tension spring 73 biases the arm 68 and the shifting ring 69 at all times in clockwise direction as viewed in Fig. 2. The tension spring 73 biases the shifting ring 69 and the clutch mechanism to the clutch-open position or the position opposite that shown in the drawings. Accordingly, as shown in the drawings, the electro-magnet 65 is energized and the spring 73 extended so that the clutch is in its closed position and high speed operation of the sleeve 24 is effected.

Movement of the shifting ring 69 axially within the casing member 15 is afforded by a plurality (three in number) of inwardly-extending projections 74 which are suitably secured to the casing member 15 and which extend into openings 75 formed in the ring 69, which openings define segments of a helix in the ring. This construction is best shown in the detail view, Fig. 5. In order to reduce friction between the walls of the openings 75 and the projection 74, the latter is preferably formed by a pin 76, carried by the casing 15, and a roller or bushing 77 interposed between the pin 76 and the walls of the openings 75. From the description thus far given, it will be apparent that as the shifting ring 69 is moved angularly, it will also be moved axially because of the angular disposition of the openings 75. In this connection, it will be noted that the opening 72 is also so formed as to permit both angular and axial movement of the arm 68 therein. The pin and slot connection 71 permits the arm 68 to move transversely with respect to the armature 67 during movement of the armature in either direction.

Upon deenergization of the electro-magnet 65 the spring 73 moves the shifting ring 69 clockwise as viewed in Fig. 2 and effects an axial movement of the ring 69 to the right as viewed in Fig. 1. During the latter movement of the ring 69, the side thereof engages an outwardly-extending flange 79 formed on the orbit gear structure 38 and further movement of the ring 69 to the right moves the orbit gear structure 38 and the clutching member 45 to the right sufficiently to disengage the clutching faces 43 and 44. In this connection, it will be noted that the ratchet teeth 58 extend to the left beyond the pawl 59 to allow for this axial movement of the orbit gear structure and, furthermore, that the extension 64 of the drag ring 62 is of such length that it engages the pawl 59 at all times. Furthermore, the face of the planet gear 37 is somewhat longer than the face of the orbit gear teeth so that full tooth engagement between the orbit and the planet gears is effected at all times.

*Operation*

As stated heretofore, the mechanism, as shown in the drawings, is in its clutch-closed, or high-speed, position. The electro-magnet 65 is energized so that the shifter ring 69 is in its left-hand position as viewed in Fig. 1. Accordingly, the spring 55 biases the orbit gear member 38 and the clutch member 45 to the left and maintains the clutching surfaces 43 and 44 in engagement. The drive is, therefore, directly from the driving shaft 29 through the pin 47 and the clutching members 41 and 45 to the sleeve 24. The basket 12 is, therefore, rotated in the example given at 490 R. P. M. or at the speed of the driving shaft 29. At this time it will be apparent that the sun gear 36, planet gear 37 and the orbit gear structure 38 are locked together by the clutching mechanism and all rotate in unison about the axis of the driving shaft 29.

Slow-speed operation of the basket 12 is initiated by deenergizing the electro-magnet 65. This operation permits the spring 73 to move the shifter ring angularly and axially as described heretofore. During axial movement of the shifter ring 68 to the right, engagement between the ring 69 and the flange 79 is effected and further axial movement of the ring 69 to the right produces an axial movement of the orbit gear structure 38 to the right against the bias of the spring 55. Because of the pin and slot connection 54—49, the clutching member 45 is moved slightly to the right whereby disengagement of the clutching faces 43 and 44 is effected.

During this operation, a braking action is produced by the ring 69 and flange 79 which decelerates the orbit gear structure 38. As the orbit gear structure 38 is decelerated, the planetary gear mechanism becomes effective and the axis of the planet gear 37 starts moving in clockwise direction relative to the orbit gear as viewed in Fig. 2. After rotation of the orbit gear structure 38 is terminated, there will be a tendency for it to rotate in the opposite direction which tendency is, of course, resisted by the brake flange 79. Rotation of the orbit gear structure 38 in this reverse direction due to any slippage of the brake (this direction being clockwise as viewed in Fig. 3) is prevented by the pawl and ratchet mechanism, the operation of which has been described heretofore. As the orbit gear 38 is now stationary, the basket and sleeve 24 are driven at a slow speed of, for example, 52 R. P. M. by the planet gear 37 and its supporting member 41 in a well-understood manner.

From the foregoing description, it will be apparent that I have provided an improved organization of elements in a multiple-speed planetary gear transmission which is compact and which may be readily and economically produced. The compactness of this apparatus renders it particularly adaptable for use with multiple-speed laundry machines, as the transmission may be readily applied to the tub structure and directly connected to the basket without making the assembly bulky. This is particularly advantageous when the tub is flexibly supported, and therefore movable, within a housing, it being understood that the amount of movement of the tub that can be tolerated is limited.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. In a transmission, the combination of a casing structure, a driven sleeve extending through one end of the casing structure, a driving shaft extending through a second end of the casing and extending within said sleeve, a bearing interposed between the driving shaft and the end of the casing through which it projects, a second bearing for journalling the end of the driving shaft within said sleeve, a third bearing arranged intermediate the first and second-mentioned bearings in an axial direction and interposed between the sleeve and the end of the casing through which it projects, and a planetary gear mechanism connecting the shaft and sleeve and arranged intermediate the first and third bearings.

2. In a transmission, the combination of a casing, a driven sleeve extending through one end of the casing and terminating within the casing adjacent the opposite end thereof, a driving shaft extending through said opposite end of the casing and extending within said sleeve, first and second axially-spaced bearings disposed within the sleeve for supporting the driving shaft, a third bearing arranged between the sleeve and the end of the casing through which it projects, a fourth bearing interposed between the driving shaft and the end of the casing through which it projects, and a planetary gear mechanism connecting the driving shaft and the sleeve and disposed within the casing, said gear mechanism being arranged axially intermediate the first and second-mentioned bearings.

3. In a transmission, the combination of a casing structure, a driven sleeve extending through one end of the casing structure and provided with a radially-extending opening intermediate the ends thereof, a driving shaft extending through a second end of the casing and journaled in said sleeve, first and second bearings associated with the casing structure for supporting said sleeve and shaft, a sun gear carried by said shaft, an orbit gear, a planet gear meshing with the sun and orbit gears and extending through said opening in the sleeve, a member secured to the sleeve and rotatably supporting said planet gear, said member including a clutching element, a second clutching element engageable with said first element and rotatably carried by said sleeve, said second clutching element being movable axially of the sleeve, means connecting said driving shaft and second clutching element so that the latter is rotated with said driving shaft at all times, and means for engaging and disengaging said first and second clutching elements.

4. In a transmission, the combination of driving and driven shafts, a planetary gear mechanism connecting said shafts and including an orbit gear structure, a clutch including first and second clutching elements rotatable with the respective shafts, means for supporting said orbit gear structure and providing for rotary and axial movement thereof, means defining a braking surface on the orbit gear structure, a braking member cooperating with said braking surface, means for engaging and disengaging said braking member and braking surface and effecting axial movement of the orbit gear structure in one direction as said braking member and surface are engaged and axial movement thereof in another direction as the braking member and surface are disengaged, and means connecting the orbit gear structure and one of said clutching elements for providing disengagement and engagement of the clutch as the orbit gear is moved axially in said one and another direction, respectively.

5. In a transmission, the combination of co-axially-aligned driving and driven shafts, a planetary gear mechanism connecting said shafts and including an orbit gear structure rotatable about the axis of said shafts and axially movable thereof, a clutch including a first clutching element rotatable with said driven shaft and a second clutching element engageable with the first clutching element and rotatable with said driving shaft, means connecting said orbit gear structure and said second clutching element and providing for axial movement of the latter as the former is moved axially, means defining a braking surface on the orbit gear structure, a braking member cooperating with said braking surface, and actuating means for moving said braking member into engagement with said braking surface and for effecting axial movement of the orbit gear structure in one direction, said actuating means effecting axial movement the orbit gear structure in another direction as said braking member and surface are disengaged, whereby said clutching elements are disengaged and engaged as the orbit gear structure is moved axially in said one and another direction, respectively.

6. In a transmission, the combination of a casing, coaxially-aligned driven and driving shafts extending into the casing, a planetary gear mechanism associated with said shafts and including an orbit gear structure, a clutch, means for supporting said orbit gear structure and providing for rotary and axial movement thereof, means connecting the orbit gear structure and said clutch and effective to engage the clutch as the orbit gear structure is moved axially in one direction and for disengaging the clutch as the orbit gear structure is moved axially in the other direction, means associated with the orbit gear structure for defining a braking surface, a braking member cooperating with said braking surface, means for actuating said braking member into and out of engagement with said braking surface, said actuating means effecting axial movement of the orbit gear structure in clutch-disengaging direction when said member is moved into engagement with the braking surface and axial movement of the orbit gear structure in clutch-engaging direction when said member is moved out of engagement with the braking surface, and a pawl and ratchet mechanism interposed between the orbit gear structure and said casing for limiting rotation of the orbit gear structure to a single direction.

7. In a transmission, the combination of a casing, driven and driving shafts extending into the casing, a planetary gear mechanism associated with said shafts, and including an orbit gear structure, a clutch interposed between the shafts, means for supporting said orbit gear structure and providing for rotary and axial movement thereof, a connection between said orbit gear structure and said clutch for engaging the latter as the orbit gear is moved axially in one direction and for disengaging the clutch as the orbit gear is moved axially in the other direction, means defining a braking surface on said orbit gear structure, a braking ring cooperating with said braking surface, means for supporting said ring in said casing and providing for axial and angular movement of the ring, means for actuating said braking ring into and out of engagement with said braking surface, said ring effecting axial movement of the orbit gear in clutch-disengaging direction when moved into engagement with the braking surface and axial movement of the orbit gear in clutch-engaging direction when moved out of engagement with the braking surface, ratchet teeth formed on said orbit gear structure, a pawl pivoted to said casing and cooperating with the ratchet teeth, said pawl and ratchet teeth preventing rotary movement of the orbit gear in one direction, and a drag ring frictionally engaging the orbit gear structure and connected to said pawl for moving the latter out of engagement with said ratchet teeth when the orbit gear structure is rotated or moved angularly in the opposite direction.

8. In a transmission, the combination of a casing structure, a driven member extending into the casing structure and including a sleeve portion, a driving shaft extending into the casing structure and journaled within said sleeve portion, a planetary gear mechanism connecting the driving shaft with said driven member and including a sun gear, an orbit gear, and a planet gear, a member secured to said sleeve and rotatably supporting said planet gear, clutch means interposed between the driving shaft and said sleeve and including a clutching surface formed on said supporting member and a clutch element cooperating with said clutching surface, said clutch element being journaled exteriorly of said sleeve and movable axially thereof, said orbit gear structure being rotatably mounted upon said clutch element, means for preventing axial movement of the orbit gear structure relative said clutch element, means defining a braking surface on said orbit gear structure, a brake ring, means for supporting said brake ring within said casing coaxially with respect to the orbit gear structure, said supporting means providing for angular and axial movement of the brake ring within the casing, said brake ring, when engaging the braking surface, being effective to bias said clutch to its open position and, when actuated to the position wherein it is disengaged from the braking surface, said clutch is engaged, a pawl carried by the casing structure, ratchet teeth carried by the orbit gear structure and engageable with the pawl for preventing rotation of the orbit gear structure in one direction, and a drag ring frictionally engaged with the orbit gear structure and connected to the pawl for moving the pawl clear of engagement with the ratchet when the orbit gear structure is rotated in another direction.

9. In a transmission, the combination of a driven member including a sleeve portion disposed within the casing, a driving shaft having a portion thereof journaled within the sleeve portion, a planetary gear mechanism interposed between said sleeve portion and the driving shaft and including an orbit gear structure, a sun gear, and a planet gear, clutch means interposed between the driving shaft and said sleeve and including relatively movable members the first of which is secured to said sleeve and defines a support for the planet gear and the second of which is rotatably carried by the sleeve, means defining a driving connection between the driving shaft and said second clutch member and providing for axial movement of the second clutch member, said orbit gear structure being rotatably supported upon said second clutch member, means for preventing axial movement of the orbit gear structure relative the second clutch member, means for biasing the orbit gear structure and the second clutch member toward the clutch-open position, and electro-magnetically-operated means for actuating the clutch toward its engaged position in opposition to said biasing means; said clutch-actuating means including means disposed within the casing for moving the orbit gear structure axially in clutch-opening and clutch-closing directions.

10. In a transmission, the combination of a casing, driving and driven members extending into the casing, a planetary gear mechanism connected with the driving and driven members, a brake and clutch mechanism associated with the planetary gear mechanism, means for actuating the brake and clutch mechanism including a ring journaled within the casing, said ring having a plurality of circumferentially - spaced slots formed therein, said slots defining a segment of a helix, a plurality of pins secured within the casing and extending into the respective slots, an actuating arm secured to said ring and extending exteriorly of the casing, and electro-magnetically-operated means for moving said ring and arm angularly about the axis of the planetary gear mechanism for actuating said clutch and braking mechanism.

HILBERT E. EDWARDS.